Figure 1:
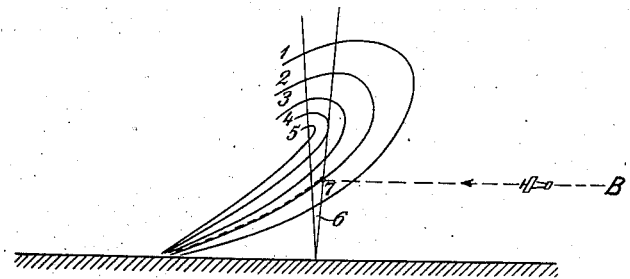

Dec. 31, 1940.  W. M. HAHNEMANN ET AL  2,226,718
METHOD OF LANDING AIRPLANES
Filed Nov. 19, 1937   2 Sheets-Sheet 1

Inventors:
Walter Max Hahnemann
Ernst Kramar
by R.C. Hopgood
Attorney

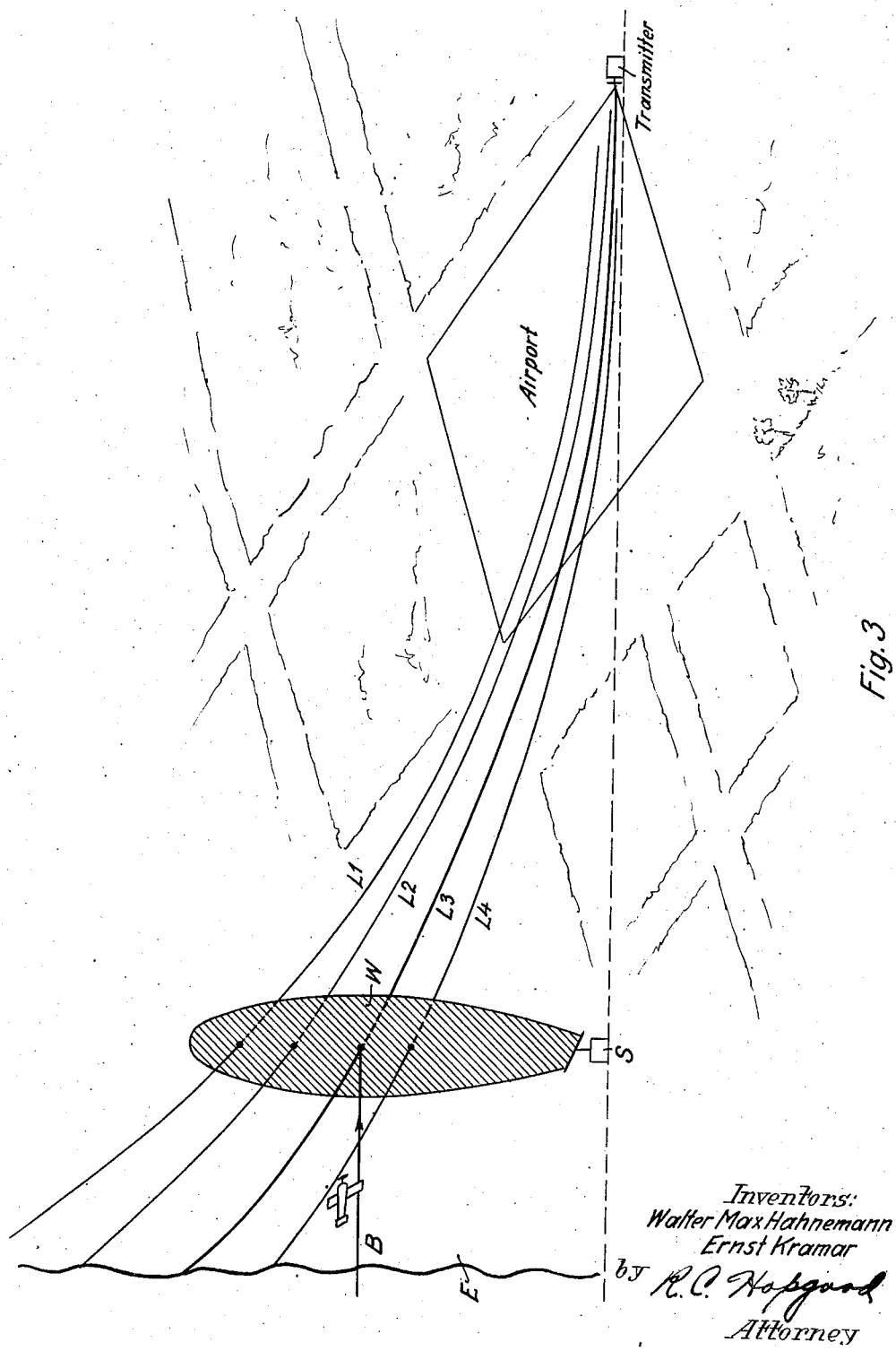

Patented Dec. 31, 1940

2,226,718

UNITED STATES PATENT OFFICE 2,226,718

METHOD OF LANDING AIRPLANES

Walter Max Hahnemann, Berlin-Marienfelde, and Ernst Kramar, Berlin-Tempelhof, Germany, assignors to C. Lorenz Aktiengesellschaft, Berlin-Tempelhof, Germany, a company Application November 19, 1937, Serial No. 175,431
In Germany May 10, 1933

2 Claims. (Cl. 250—11)

The present application is a continuation in part of our copending U. S. patent application Ser. No. 722,470, filed on April 26, 1934, Patent No. 2,196,674 dated April 9, 1940 for Systems for landing airplanes, and relates to an improvement upon such arrangements.

It is well known for purposes of facilitating the landing of airplanes to employ so-called slip-way beacons which radiate a torus-shaped bundle of ultra-short electromagnetic waves at a certain angle to the ground surface. The landing may be so effected that the airplane descends on a curve of constant field intensity. Two fundamentally different methods are known for producing said slip-way beacons.

According to one of these methods, a radiation is equally transmitted into all directions in the horizontal plane, while in the vertical plane being directed upwardly inclined, so as to produce a torus-shaped radiation diagram, that is to say, landing surfaces are defined on which an airplane may descend along any of an infinite number of lines. In order to indicate to the airplane the landing course to the airport, additional transmitting and receiving equipments are necessary for determining the position in the horizontal plane.

For the purpose of removing the disadvantage involved by additional means, it has been proposed to replace the landing surfaces of the first mentioned method by landing path lines which simultaneously indicate to the pilot the position in the vertical as well as in the horizontal plane. This type of landing lines may, for example, be produced by intermittently transmitting from an ultra-high frequency transmitter two differently directed radiations, e. g. in a dot-dash, or A-N-rhythm, said radiations being combined to form a continuous dash signal on the line of equal field intensity. Both alternately keyed radiations are directed obliquely upwards and co-operate so as to permit the airplane to descend on a curve of constant field intensity. In order to reliably realize this method, it has hitherto been necessary to ensure that the transmitter maintains its power continuously constant, and that the receiver always has the same sensitivity. This requirement may relatively easily be fulfilled on the transmitter side by suitably supervising not only the transmitter, but also the transmitter field. On the receiving side, however, considerable difficulty is experienced, as the sensitivity of the receiver must remain the same over a long period of time. To give an example in a Berlin to London flight, the receiver which has to be adjusted in Berlin must maintain a constant sensitivity until the landing in London, which will take place several hours later. It will, of course, be possible to disconnect the receiver during the journey, but upon re-insertion before the actual landing in London it must have the same sensitivity. It will readily be seen that this is not easily accomplished due to the extraordinarily high sensitivity of modern receivers, particularly with respect to adjustment variations.

The present invention relates to a slip-way beacon method of producing landing path lines, as already mentioned in the foregoing, said lines being adapted to give the pilot an indication with respect to the position of the airplane in the vertical as well as in the horizontal plane, said indications being simultaneously received. According to the invention, it is proposed to effect this slip-way beacon method in such a manner that the beginning of the landing is indicated by an additional signal indication, and that the indication of field intensity which exists at the moment of reception of the additional signal indication is employed to determine the actual landing path.

Figure 2:
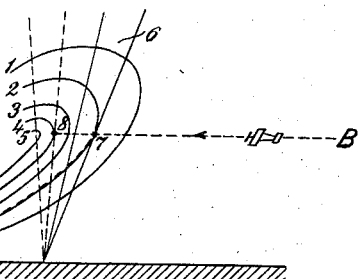

The invention will be fully appreciated from the following description taken in conjunction with the attached drawings, in which:

Fig. 1 and Fig. 2 each shows an elevation of a landing ground, while

Fig. 3 perspectively illustrates a landing ground and the appertaining landing path lines.

Figure 4:
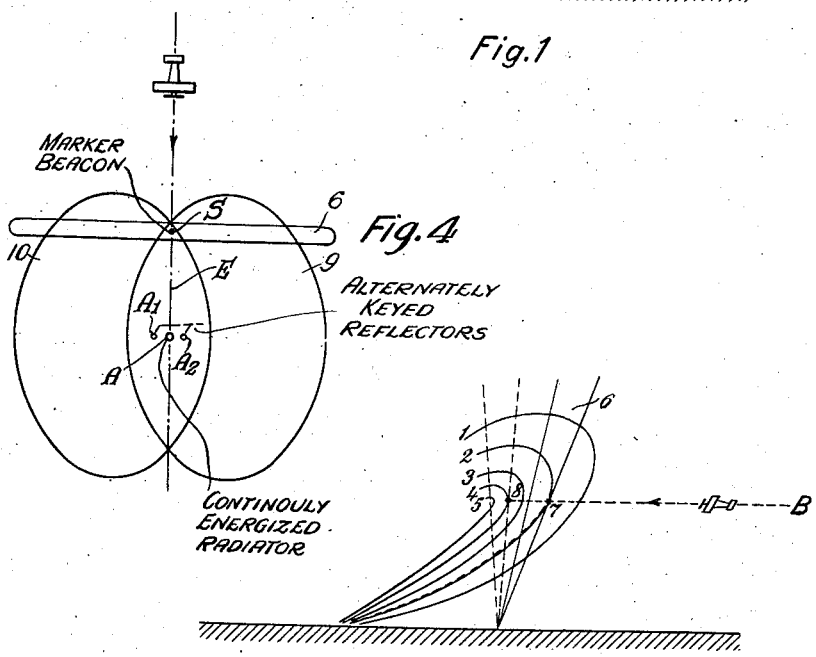

Fig. 4 shows a plan view of the radiation fields.

Referring to the Figs. 1 and 2, the reference numerals 1 to 5 designate different surfaces of equal field intensity of a torus-shaped radiation diagram produced in any known manner. These toroidal surfaces of equal field intensity are utilized by the airplane for landing purposes for defining the landing path in the vertical plane. The definition of the landing path lines in the horizontal plane is effected by intermittently keying two obliquely upwards directed bundles of rays. One of the bundles is effective during the keying gaps of the other, so as to produce a zone of constant field intensity. The course line of the airplane is designated B.

The method hitherto employed is based on the fact that the airplane, which in the first instance arrives horizontally on its guiding course line B, remains on this course in the bundle of rays until it reaches the field intensity in which it must descend. As soon as a predetermined deflection of the indicating device of the receiver is reached, the airplane descends. However, as already explained in the foregoing, this requires a continuous constancy with respect to the sensitivity of the receiver.

According to the invention, the point at which the landing should be commenced is given by an additional signal indication 6, which, as shown in Fig. 1 is directed perpendicularly, or as shown in Fig. 2, obliquely upwards. The additional indication may either be given acoustically or by wireless. With the oblique direction, the indication may preferably be given by wireless. The airplane flies on horizontally until it reaches point 7, at which it receives the indication 6. It then descends from the point 7 so that the deflection of the indicating instrument remains the same as it was at the moment of the arrival of the signal indication 6. The actual degree of the deflection of the indicating device is immaterial, and it is not critical if the senstivity of the receiver has been changed since the commencement of the journey. The indicating device now fulfills the problem of ensuring the descent on a curve of equal field intensity during the short period of landing.

The oblique direction of the signal indication 6 shown in Fig. 2, has the advantage that an airplane whose horizontal track of flight B is higher than that of Fig. 1, likewise descends on the field intensity curve 2 and not on the field intensity curve 4, for which point 8 indicates the beginning of the landing. For comparison, the perpendicular designation in Fig. 2 is shown in dotted lines.

According to Fig. 3, a transmitter radiates a number of landing path lines L1, L2, L3 and L4, all located in the same plane E which is produced by the equal field intensities of two intermittently keyed and differently directed radiation diagrams. The difference between the individual landing path lines L1 to L4 appears as different field intensities in the plane E. According to the invention, a further transmitter S is provided, which radiates a wall-shaped radiation W perpendicular with respect to the landing path lines, which all extend through said radiation. The airplane approaching the airport on the course line B, descends on the landing path line L3 immediately after having passed through the wall-shaped radiation W.

The field patterns of the beacon system can be more clearly seen in Fig. 4. In this figure a continuously energized antenna A and two alternately energized reflectors $A_1$, $A_2$, are shown. This guiding system may be of the type shown for example in U. S. Patent 2,028,510 issued to E. Kramar on January 21, 1936. The alternate keying of reflectors $A_1$ and $A_2$ produces field patterns 9, 10 arranged to intersect in an equal signal plane indicated by line E. The pattern form with respect to the landing surface will be curved as indicated by curves $L_1$—$L_4$ of Fig. 3. A marker beacon S produces an additional signal as indicated by radiation pattern 6. In landing an airplane follows along equi-signal plane E in a substantially horizontal plane until receiving additional signal 6. The airplane then descends along a line such as $L_1$—$L_4$ in the equi-signal plane until it reaches the landing surface.

The additional signal indication may be given by means of devices which are in themselves well known, and known types of beacons previously employed for indicating the landing ground boundaries are readily adapted for this purpose. In the simplest case a parabolic reflector may be employed which concentrates a beam of electromagnetic rays perpendicularly or obliquely upwards.

It is also possible to employ a plane of radiation instead of a bundle of rays, this plane being penetrated by the airplane If an acoustic indication is employed, then suitable directing means may be used for the sound transmitters or sound transmitter combinations.

In the following claims the expression "lineal path" is employed in its true meaning of "line-like," thus including both rectilinear and curvilinear paths.

What is claimed is:

1. The method of landing aircraft which comprises establishing in the vicinity of the place where landing is desired, an electro-magnetic signal distribution comprising two unlike signals and defining a number of inclined lineal paths of different inclinations, such paths being distinguishable from other points in space by differences in intensity ratio of said two unlike signals, and the different ones of said paths being distinguishabe from one another by differences in absolute field intensity, establishing reference points in space by transmitting additional electromagnetic signals intersecting said paths, directing an aircraft substantially horizontally in a line determined by comparison of said unlike signals to one of said points in space, receiving said additional signals on said aircraft, indicating the absolute field intensity of said unlike signals received at this point and thereafter landing said aircraft in a vertical plane along a predetermined one of said paths by comparing the absolute intensity of said unlike signals received on said aircraft with the absolute intensity of said signals received at said reference point.

2. The method of landing airplanes which comprises radiating a plurality of beams of electromagnetic energy having surfaces of different field intensities at progressive varying angles to the ground, radiating a further similar plurality of beams intersecting said first plurality, alternately keying said two plurality of beams to define a zone of equal intensity, directing a signal upwardly to intersect said zone of equal intensity at a point in space from which landing should be commenced, and utilizing the indication on the airplane of the field intensity which prevails at the moment of reception of said signal at said intersection as a reference level for determining the field intensities thereafter required for defining a predetermined landing path for the airplane.

WALTER MAX HAHNEMANN.
ERNST KRAMAR.